(12) United States Patent
Kim et al.

(10) Patent No.: US 9,903,472 B2
(45) Date of Patent: Feb. 27, 2018

(54) PARKING RELEASE DEVICE

(71) Applicant: KYUNG CHANG INDUSTRIAL CO., Ltd., Daegu (KR)

(72) Inventors: Kyu-Jung Kim, Daegu (KR); Sang Kyu Chang, Daegu (KR)

(73) Assignee: KYUNG CHANG INDUSTRIAL CO., Ltd., Daegu (KR)

( * ) Notice: Subject to any disclaimer, the term of this patent is extended or adjusted under 35 U.S.C. 154(b) by 0 days.

(21) Appl. No.: 15/343,438

(22) Filed: Nov. 4, 2016

(65) Prior Publication Data

US 2017/0138475 A1 May 18, 2017

(30) Foreign Application Priority Data

Nov. 13, 2015 (KR) .......................... 10-2015-0159337

(51) Int. Cl.
*F16H 63/34* (2006.01)
(52) U.S. Cl.
CPC ................................ *F16H 63/3491* (2013.01)

(58) Field of Classification Search
CPC .......... B60T 7/08; B60T 7/10; F16H 63/3491; F16H 63/3416
See application file for complete search history.

(56) References Cited

FOREIGN PATENT DOCUMENTS

CH          319464 A  *  2/1957  .............. B60T 1/005

* cited by examiner

*Primary Examiner* — Thomas C Diaz
(74) *Attorney, Agent, or Firm* — Fenwick & West LLP

(57) ABSTRACT

A parking release device is provided that includes: a base which is mounted on a vehicle; a lever which is coupled to the base and includes lever track; and a handle which is coupled to the base and includes a locker which is coupled to the lever track. The lever track includes a first stable position, a second stable position, a first path which connects the first stable position and the second stable position, and a second path that connects the second stable position and the first stable position. As the handle is pivoted by the release of the parking, the locker moves from the first stable position to the second stable position along the first path, and as the handle is pivoted by the performing of the parking, the locker moves from the second stable position to the first stable position along the second path.

10 Claims, 12 Drawing Sheets

[Fig. 1]
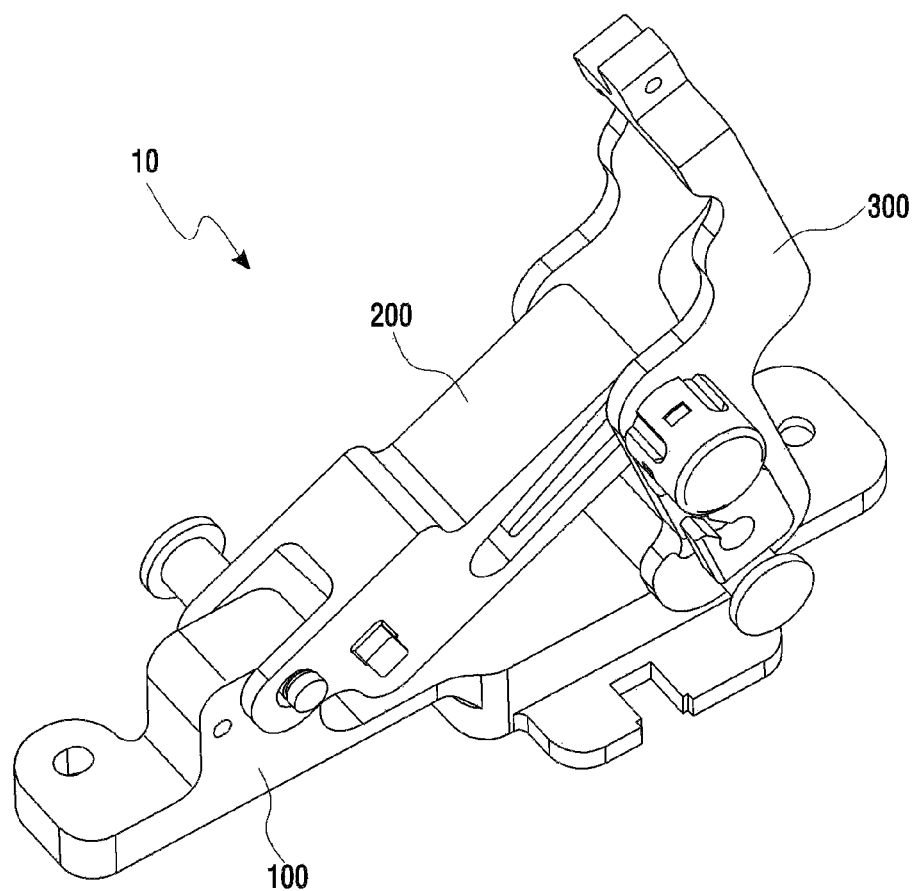

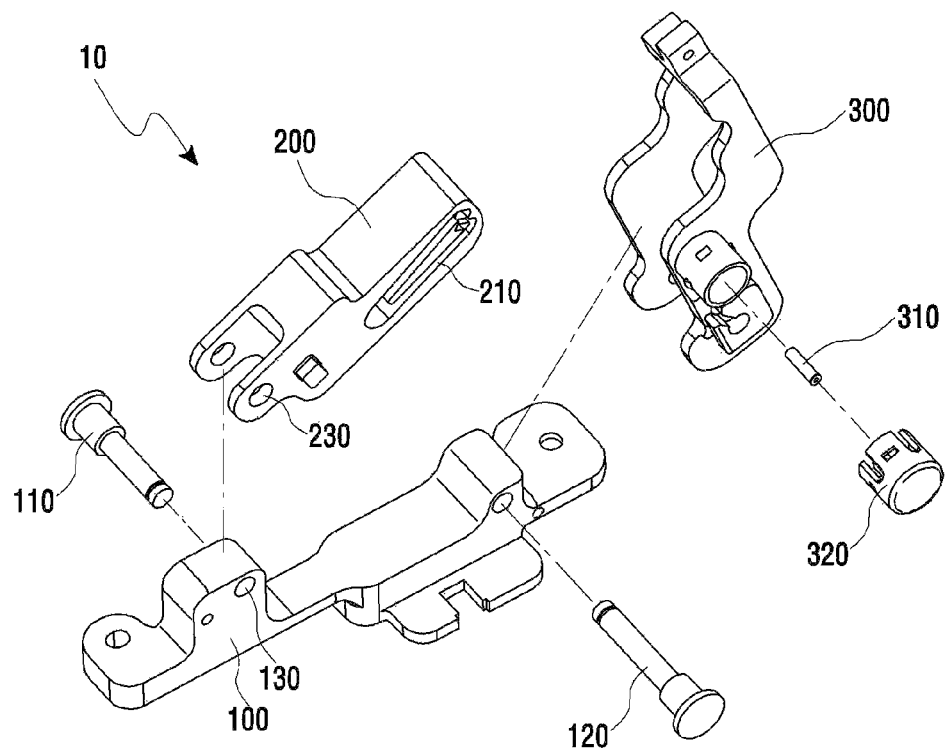
[Fig. 2]

[Fig. 3]
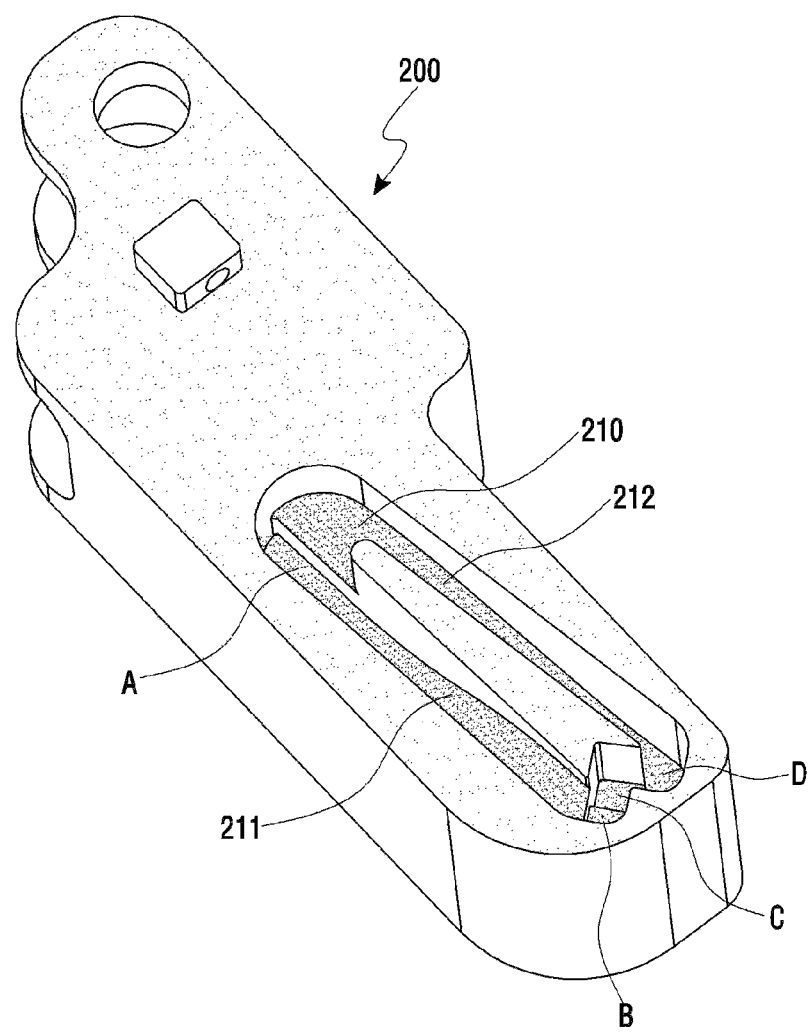

[Fig. 4A]
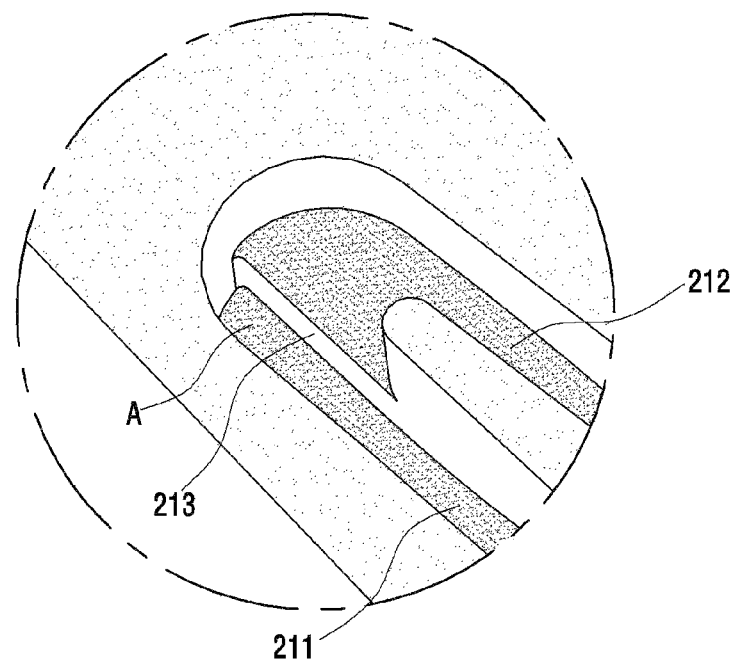
[Fig. 4B]
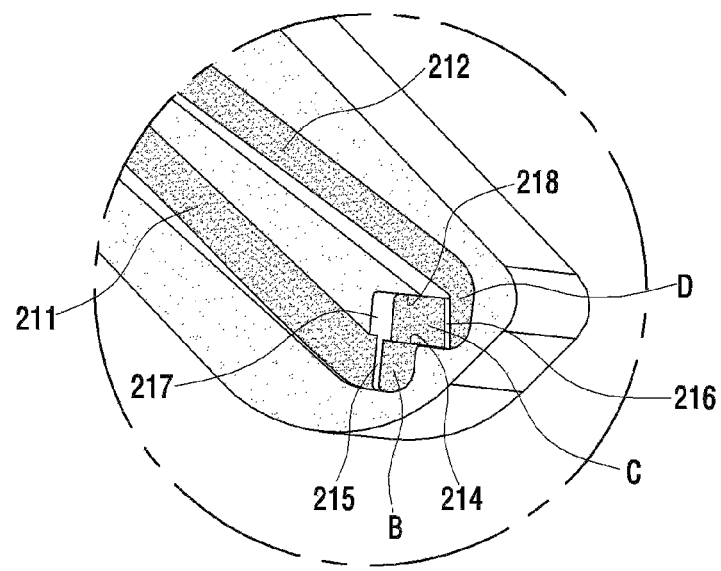

[Fig. 5A]
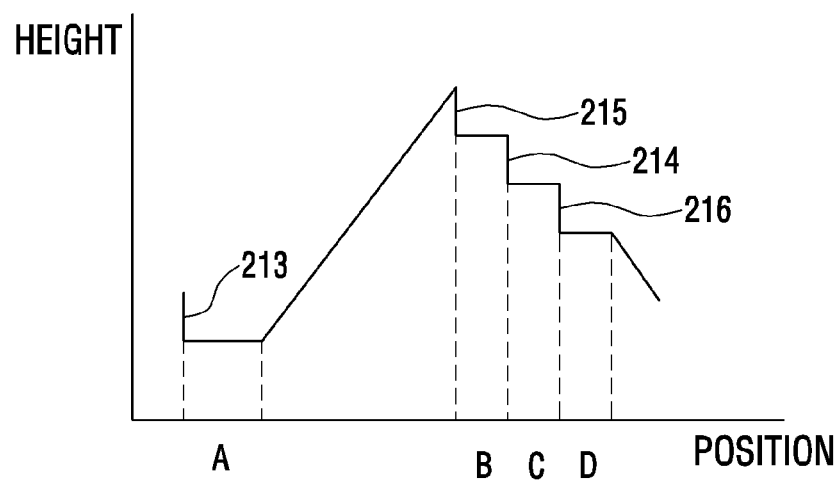
[Fig. 5B]
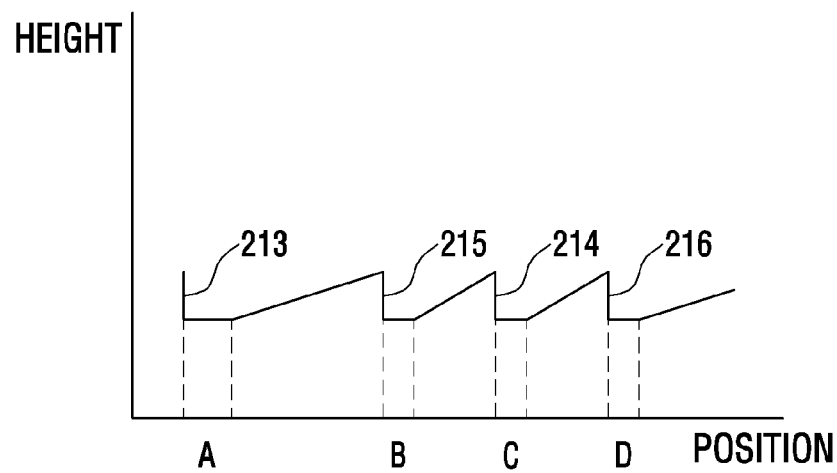

[Fig. 6]
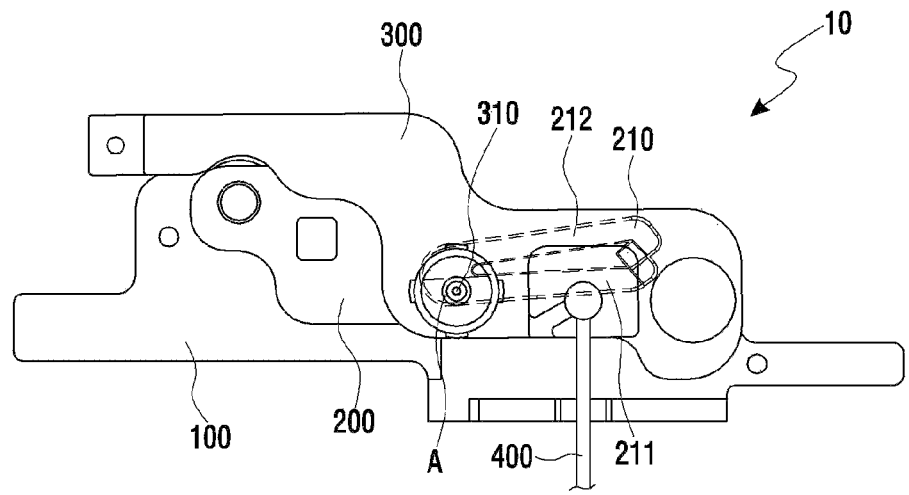
[Fig. 7]
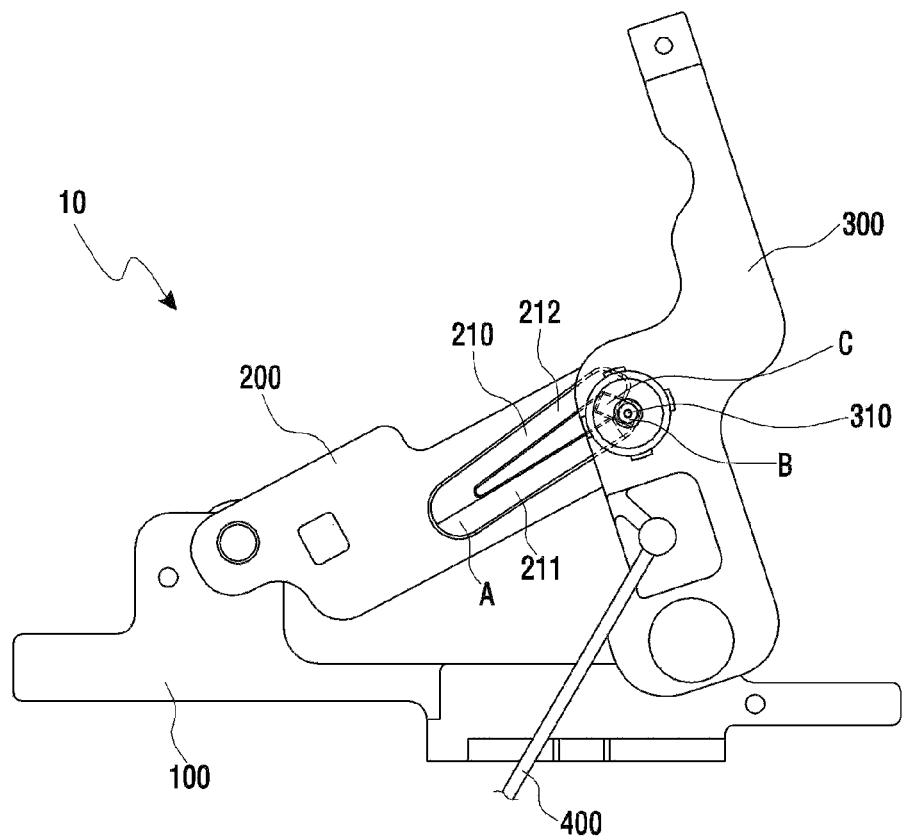

[Fig. 8]
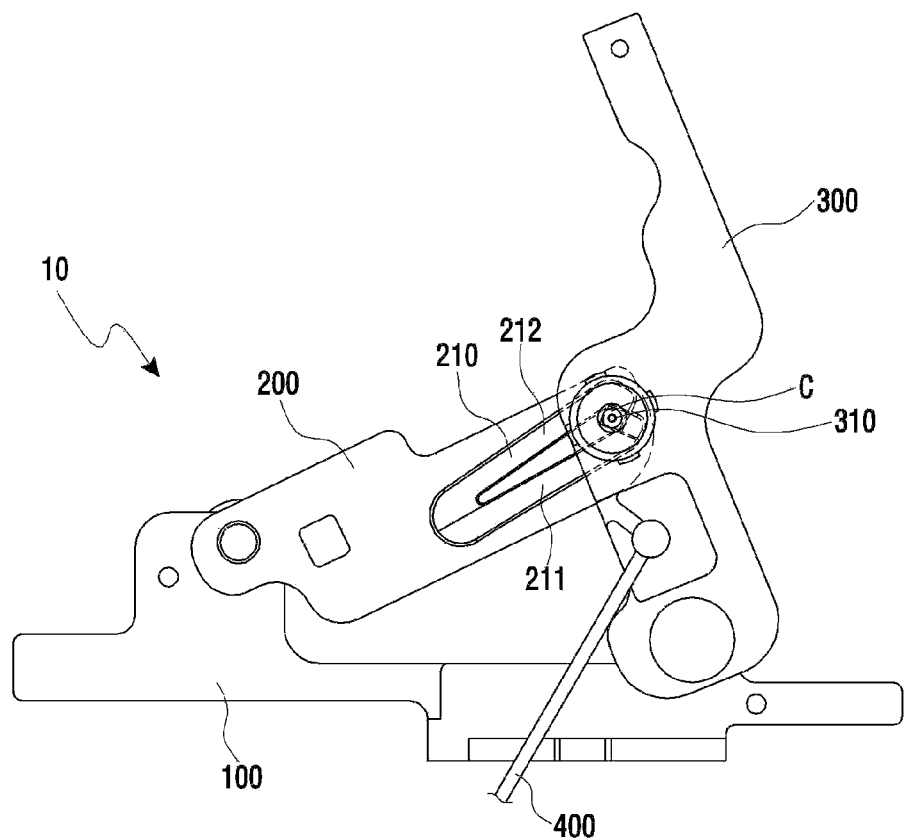

[Fig. 9]
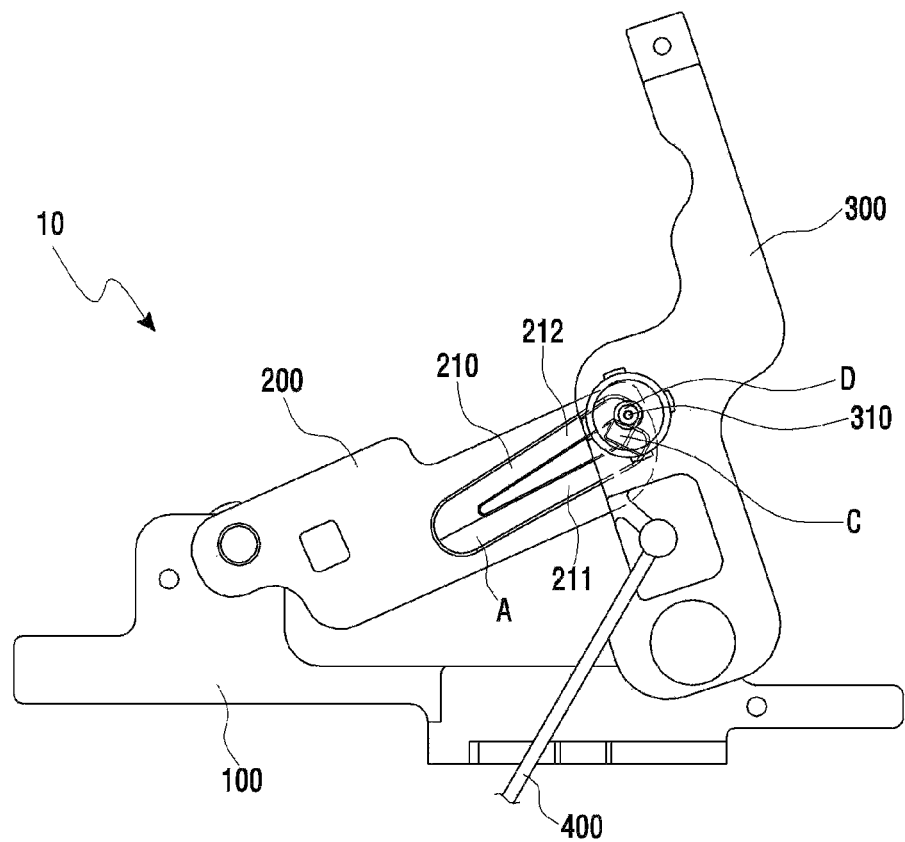

[Fig. 10]
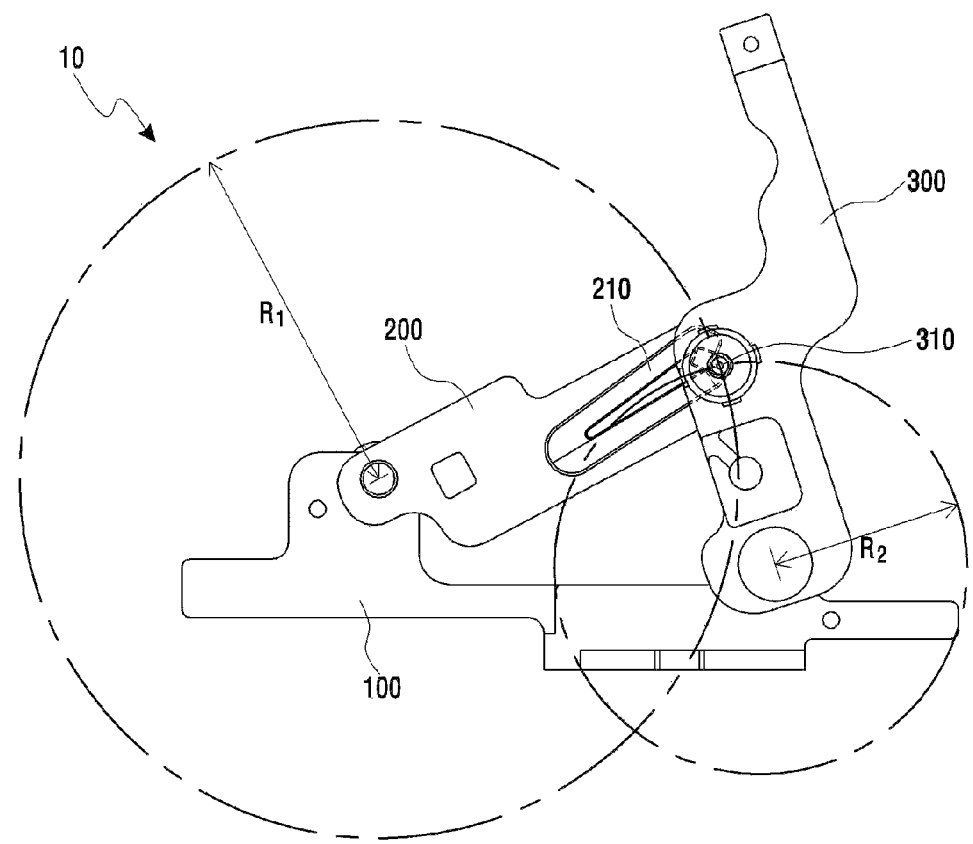

[Fig. 11A]
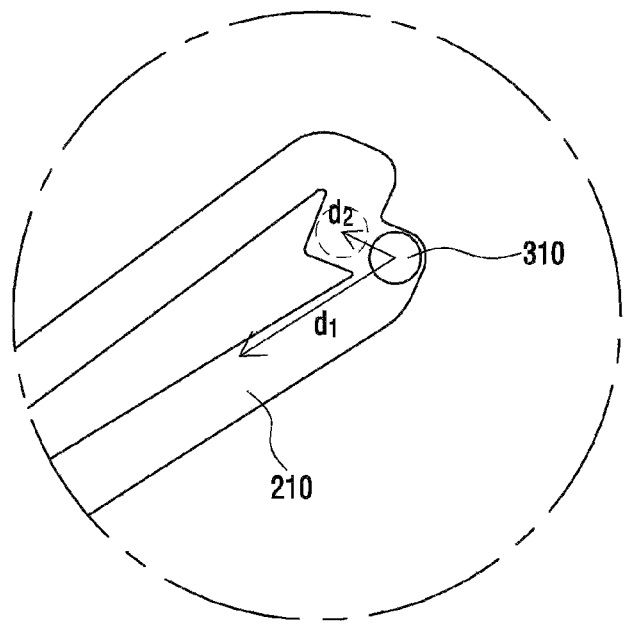
[Fig. 11B]
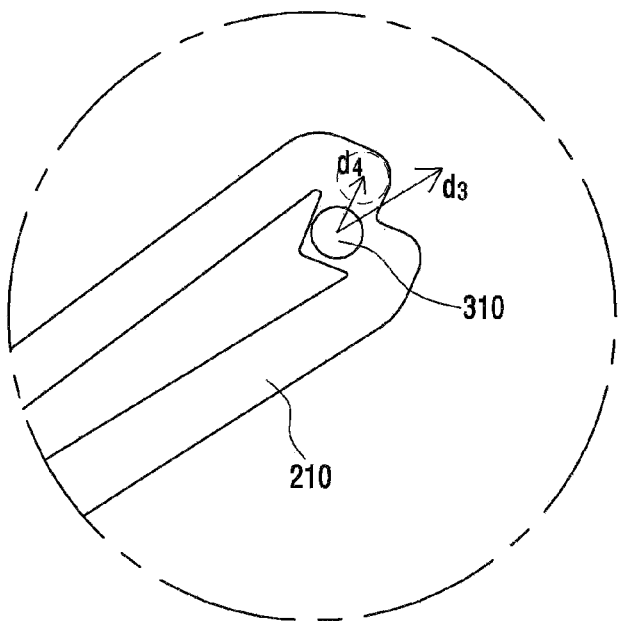

[Fig. 12A]
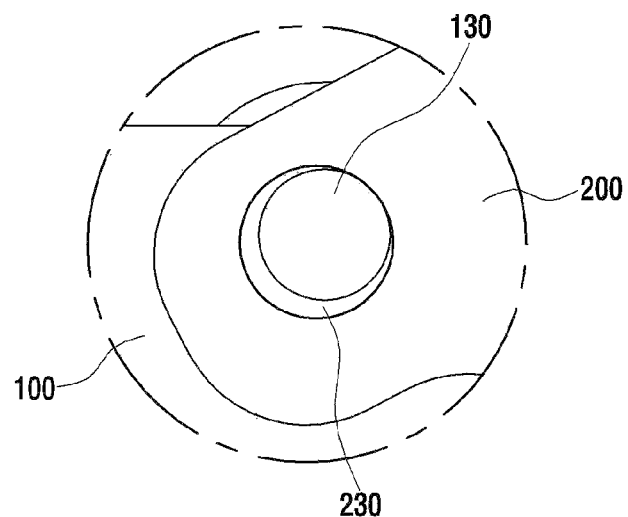
[Fig. 12B]
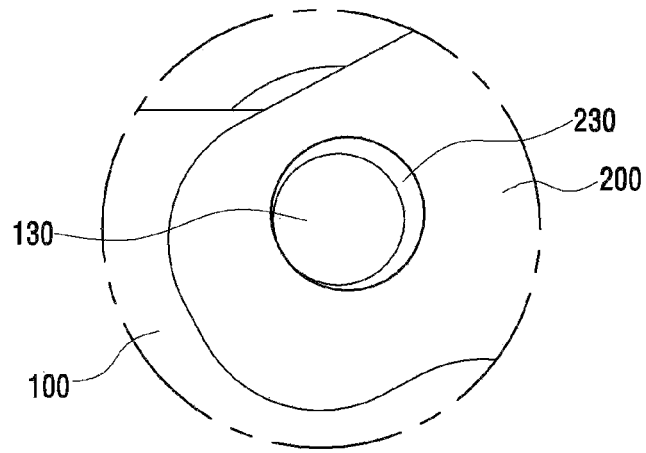

[Fig. 13A]
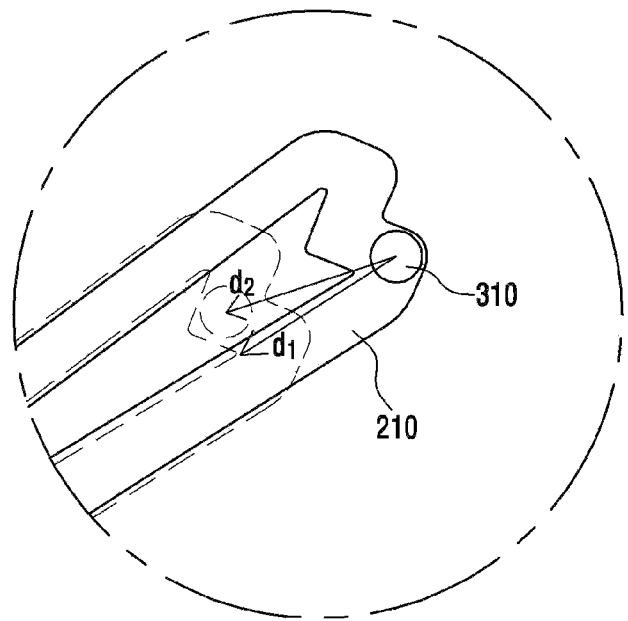
[Fig. 13B]
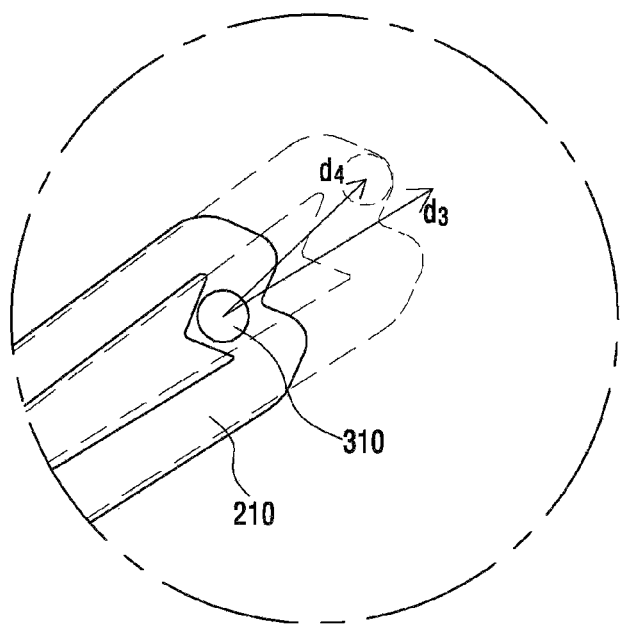

PARKING RELEASE DEVICE

CROSS-REFERENCE TO RELATED APPLICATIONS

This application claims the benefit of Korean Patent Application No. 10-2015-0159337 filed on Nov. 13, 2015, which is hereby incorporated by reference as if fully set forth herein.

BACKGROUND

Field

The present disclosure relates to a manual parking release handle device mounted on a vehicle equipped with a shift-by-wire type transmission system.

Description of the Related Art

In a vehicle equipped with a shift-by-wire type transmission system, parking should be manually released when it is impossible to change the shift position of the transmission in emergency situations such as electric discharge of the battery of the vehicle or when a shift lever is moved from the P-shift position to N-shift position, such as parking at the N-shift position, etc. Currently, the vehicle equipped with the shift-by-wire type transmission system in now increasing. At present, a combined electronic-manual parking release type or a manual parking release type is being applied to the vehicle having the manual parking release function. However, with regard to the electronic parking release type, the lever structure is complex and the number of the repeated operations of the lever is limited when the battery of the vehicle is discharged. With regard to the manual parking release type, a handle is operated by using tools and the tools are fixed in order to continuously maintain the parking release state. Additionally, the handle is returned to its original position by means of the tools in order for the parking to be performed again. Therefore, in the manual parking release type, separate tools are required and should be fixed until the parking release is finished. Accordingly, when an unexpected incident occurs during driving the vehicle, there is a possibility that the shift lever returns to the P-shift position without being able to maintain the N-shift position.

Therefore, there is a requirement for a manual parking release device which has a simple structure and a low price thereof.

SUMMARY

One embodiment is a parking release device that includes: a base which is mounted on a vehicle; a lever which is rotatably coupled to the base and has a lever track formed therein; and a handle which is rotatably coupled to the base and includes a locker which is coupled to the lever track. The lever track includes a first stable position, a second stable position, a first path which connects the first stable position and the second stable position, and a second path which is different from the first path and connects the second stable position and the first stable position. As the handle is pivoted by the release of the parking, the locker moves from the first stable position to the second stable position along the first path, and as the handle is pivoted by the performing of the parking, the locker moves from the second stable position to the first stable position along the second path.

BRIEF DESCRIPTION OF THE DRAWINGS

FIG. 1 is a perspective view of a parking release device according to an embodiment of the present disclosure;

FIG. 2 is an exploded perspective view for describing a coupling structure of the parking release device according to the embodiment of the present disclosure;

FIG. 3 is a perspective view of a lever according to the embodiment of the present disclosure;

FIG. 4A is a partial enlarged perspective view of the vicinity of a first stable position of a lever track of the lever according to the embodiment of the present disclosure;

FIG. 4B is a partial enlarged perspective view of the vicinity of a second stable position of the lever track of the lever according to the embodiment of the present disclosure;

FIGS. 5A and 5B are graphs for describing a height depending on the position within the lever track according to the embodiment of the present disclosure;

FIG. 6 is a front view for describing the operation of a parking lever device when a locker according to the embodiment of the present disclosure is positioned at the first stable position;

FIG. 7 is a front view for describing the operation of the parking lever device when the locker according to the embodiment of the present disclosure is positioned at a first temporary position;

FIG. 8 is a front view for describing the operation of the parking lever device when the locker according to the embodiment of the present disclosure is positioned at the second stable position;

FIG. 9 is a front view for describing the operation of the parking lever device when the locker according to the embodiment of the present disclosure is positioned at a second temporary position;

FIG. 10 is a front view of the parking lever device, which is for describing rotation radii of the lever and a handle according to the embodiment of the present disclosure;

FIG. 11A is a partial enlarged view showing the locker and lever track, which is for describing the locker of the parking lever device according to the embodiment of the present disclosure moves from the first temporary position to the second stable position;

FIG. 11B is a partial enlarged view showing the locker and lever track, which is for describing the locker of the parking lever device according to the embodiment of the present disclosure moves from the second stable position to the second temporary position;

FIGS. 12A and 12B are enlarged views of a first base hinge recess and a lever hinge recess of the parking lever device to which a tilting structure has been applied in accordance with the embodiment of the present disclosure;

FIG. 13A is a partial enlarged view of the locker and the lever track, which is for describing the operation when the locker of the parking lever device to which the tilting structure has been applied in accordance with the embodiment of the present disclosure moves from the first temporary position to the second stable position; and FIG. 13B is a partial enlarged view of the locker and the lever track, which is for describing the operation when the locker of the parking lever device to which the tilting structure has been applied in accordance with the embodiment of the present disclosure moves from the second stable position to the second temporary position.

DETAILED DESCRIPTION

An embodiment of the present invention will be described in detail with reference to the accompanying drawings. In the components of the present disclosure, detailed descriptions of what can be clearly understood and easily carried into practice through a prior art by those skilled in the art will be omitted to avoid making the subject matter of the present invention unclear.

Hereinafter, a parking release device according to an embodiment of the present disclosure will be described.

FIG. 1 is a perspective view of a parking release device according to an embodiment of the present disclosure. FIG. 2 is an exploded perspective view for describing a coupling structure of the parking release device according to the embodiment of the present disclosure.

Referring to FIGS. 1 and 2, a parking release device 10 according to the embodiment of the present disclosure includes a base 100, a lever 200, and a handle 300.

The base 100 may be mounted on a vehicle, and the lever 200 and the handle 300 may be coupled to the base 100 such that they can rotate. Specifically, the base 100 may include a first hinge pin 110 and a second hinge pin 120. Here, the lever 200 is coupled to the base 100 by means of the first hinge pin 110 such that the lever 200 can rotate about a first hinge axis located at a position where the base 100 and the lever 200 are coupled to each other. Also, the handle 300 is coupled to the base 100 by means of the second hinge pin 120 such that the handle 300 can rotate about a second hinge axis located at a position where the base 100 and the handle 300 are coupled to each other.

The lever 200 is coupled to the base 100 and the handle 300. As the handle 300 rotates about the second hinge axis, the lever 200 may rotate about the first hinge axis. Specifically, a lever track 210 may be formed in the lever 200, and a below-described locker 310 of the handle 300 is coupled to the lever track 210, so that the lever 200 may be coupled to the handle 300. Also, when the handle 300 rotates about the second hinge axis, the locker 310 moves along the lever track 210, and thus, the lever 200 may rotate about the first hinge axis in a direction opposite to the rotation direction of the handle 300.

The handle 300 is a member that a user directly operates in order to release a parking state, i.e., a P-shift position of a transmission of the vehicle. When the user pulls upward an end of the handle 300 in order to release the parking, the handle 300 may rotate about the second hinge axis in a first direction. Also, when the user pushes downward the end of the handle 300 in order for the parking to be performed again, the handle 300 may rotate about the second hinge axis in a direction opposite to the first direction (e.g., a second direction). Specifically, the handle 300 may include the locker 310 and a cap 320. The locker 310 is coupled to the lever track 210, so that the lever 200 can work together with the handle 300. The cap 320 is mounted on the handle 300, so that the locker 310 can be inserted and coupled within the lever track 210. Here, the cap 320 may include an elastic member (not shown) such as a spring and may press the locker 310 in the direction in which the locker 310 is inserted into the lever track 210. Also, a cable (not shown) may be connected to the handle 300, and the cable may be pulled or loosened according to the position of the handle 300. As a result, the parking may be manually released or performed to its original state.

FIG. 3 is a perspective view of the lever according to the embodiment of the present disclosure. FIG. 4A is a partial enlarged perspective view of the vicinity of a first stable position of the lever track of the lever according to the embodiment of the present disclosure. FIG. 4B is a partial enlarged perspective view of the vicinity of a second stable position of the lever track of the lever according to the embodiment of the present disclosure.

As shown in FIG. 3, the lever track 210 of the lever 200 according to the embodiment of the present disclosure may be formed in the form of a groove and may include the first stable position "A" and the second stable position "C". Also, the lever track 210 may include a first path 211 and a second path 212, which connects the first stable position "A" and the second stable position "C". Here, the first path 211 and the second path 212 may be different from each other. Here, as the handle 300 is pivoted by the release of the parking, the locker 310 may move from the first stable position "A" to the second stable position "C" along the first path 211. Also, as the handle is pivoted by the performing of the parking, the locker 310 may move from the second stable position "C" to the first stable position "A" along the second path 212.

As shown in FIGS. 3, 4A, and 4B, the lever track 210 of the lever 200 according to the embodiment of the present disclosure may further include a first stopper 213 and a second stopper 214. Here, the first stopper 213 and the second stopper 214 may include a plane perpendicular to the direction in which the locker 310 moves in the lever track 210. Therefore, the first stopper 213 prevents the locker 310 from entering the second path 212 of the lever track 210 from the first stable position "A" and causes the locker 310 to move along the first path 211 of the lever track 210. Likewise, the second stopper 214 prevents the locker 310 from entering the first path 211 of the lever track 210 from the second stable position "C" and causes the locker 310 to move along the second path 212 of the lever track 210.

The lever track 210 may further include a first temporary position "B" and a second temporary position "D". The first temporary position "B" may be located on the first path 211 and may be located between the first stable position "A" and the second stable position "C". The second temporary position "D" may be located on the second path 212 and may be located between the second stable position "C" and the first stable position "A".

The lever track 210 may further include a third stopper 215 and a fourth stopper 216. Here, the third stopper 215 and the fourth stopper 216 may include a plane perpendicular to the direction in which the locker 310 moves in the lever track 210. Therefore, the third stopper 215 prevents the locker 310 from moving toward the first stable position "A" from the first temporary position "B" and causes the locker 310 to move to the second stable position "C". Likewise, the fourth stopper 216 prevents the locker 310 from moving toward the second stable position "C" from the second temporary position "D" causes the locker 310 to move to the first stable position "A".

FIGS. 5A and 5B are graphs for describing a height depending on the position within the lever track according to the embodiment of the present disclosure.

As shown in FIG. 5A, the first stable position "A", the first temporary position "B", the second stable position "C", and the second temporary position "D" may have height within the lever track 210 in the order of the first temporary position "B", the second stable position "C", the second temporary position "D", and the first stable position "A". The first temporary position "B" is the highest. Here, an inclined surface may be disposed on the first path 211 between the first stable position "A" and the first temporary position "B". In this case, since the length of the first path 211 between the first stable position "A" and the first temporary position "B" is relatively large, a gently inclined surface can be disposed. Therefore, when the user operates the handle 300, the locker 310 moves along the gently inclined surface or a flat surface within the lever track 210, so that the locker 310 can easily move.

Also, as shown in FIG. 5B, the heights of the first stable position "A", the first temporary position "B", the second stable position "C", and the second temporary position "D" may be the same as each other within the lever track 210. Here, an inclined surface may be disposed on the first path 211 between the first stable position "A" and the first temporary position "B" and between the first temporary position "B" and the second stable position "C", and may be disposed on the second path 212 between the second stable position "C" and the second temporary position "D" and between the second temporary position "D" and the first stable position "A". In this case, since the heights of the first stable position "A", the first temporary position "B", the second stable position "C", and the second temporary position "D" are the same as each other within the lever track 210, the required depth of the lever track 210 is small. Therefore, the total thickness of the lever 200 can be reduced.

Hereinafter, the operation of the parking release device 10 according to the embodiment of the present disclosure will be described.

FIG. 6 is a front view for describing the operation of a parking lever device when the locker according to the embodiment of the present disclosure is positioned at the first stable position. FIG. 7 is a front view for describing the operation of the parking lever device when the locker according to the embodiment of the present disclosure is positioned at the first temporary position. FIG. 8 is a front view for describing the operation of the parking lever device when the locker according to the embodiment of the present disclosure is positioned at the second stable position. FIG. 9 is a front view for describing the operation of the parking lever device when the locker according to the embodiment of the present disclosure is positioned at the second temporary position.

As shown in FIG. 6, since the end of the handle 300 is normally pulled down maximally, a cable 400 connected to the handle 300 becomes loosened. Therefore, when a shift lever is positioned at the P-shift position, the parking is performed.

In this state, when the user pulls upward the end of the handle 300 in order to manually release the parking, the handle 300 rotates about the second hinge axis in the first direction. Here, since the first stopper 213 shown in FIG. 4A prevents the locker 310 from entering the second path 212 of the lever track 210 from the first stable position "A", the locker 310 moves along the first path 211 of the lever track 210.

Here, when the user continues to pull upward the end of the handle 300, the locker 310 reaches, as shown in FIG. 7, the first temporary position "B". In this case, due to an outer wall of the lever track 210 located at the first temporary position "B", the user is not allowed to pull upward the handle 300 any longer. In this state, when the user pushes downward the end of the handle 300 or when the handle 300 is moved downward naturally by the load of the lever 200 or the handle 300, the handle 300 rotates about the second hinge axis in the direction opposite to the first direction. Here, since the third stopper 215 shown in FIG. 4B prevents the locker 310 from moving toward the first stable position "A" from the first temporary position "B", the locker 310 moves to the second stable position "C".

As such, when the handle 300 rotates in the first direction, the cable 400 connected to the handle 300 is pulled. Therefore, even though the shift lever is positioned at the P-shift position, the parking can be manually released. Inner walls 217 and 218 of the lever track 210 which are shown in FIG. 4B and are located at the second stable position "C" prevents, as shown in FIG. 8, the locker 310 located at the second stable position "C" from moving downward. Therefore, so long as the user does not pull upward the handle 300, the position of the handle 300 is stably maintained.

In this state, when the user pulls upward the end of the handle 300 in order for the parking to be performed again, the handle 300 rotates about the second hinge axis in the first direction. Here, since the second stopper 214 shown in FIG. 4B prevents the locker 310 from entering the first path 211 of the lever track 210 from the second stable position "C", the locker 310 moves along the second path 212 of the lever track 210.

Here, when the locker 310 reaches, as shown in FIG. 9, the second temporary position "D", due to an outer wall of the lever track 210 located at the second temporary position "D", the user is not allowed to pull upward the handle 300 any longer. In this state, when the user pushes downward the end of the handle 300 or when the handle 300 is moved downward naturally by gravity, the handle 300 rotates about the second hinge axis in the direction opposite to the first direction. Here, since the fourth stopper 216 shown in FIG. 4B prevents the locker 310 from moving toward the second stable position "C" from the second temporary position "D", the locker 310 moves to the first stable position "A". Accordingly, the parking release device 10 can return, as shown in FIG. 6, to its normal state.

As such, when the handle 300 rotates in the direction opposite to the first direction, the cable 400 connected to the handle 300 becomes loosened. Therefore, parking can be performed again.

FIG. 10 is a front view of the parking lever device, which is for describing rotation radii of the lever and the handle according to the embodiment of the present disclosure.

As shown in FIG. 10, an outermost rotation radius "R1" of the lever track 210 of the lever 200 may be different from a rotation radius "R2" of the locker 310 of the handle 300.

FIG. 11A is a partial enlarged view showing the locker and lever track, which is for describing the locker of the parking lever device according to the embodiment of the present disclosure moves from the first temporary position to the second stable position. FIG. 11B is a partial enlarged view showing the locker and lever track, which is for describing the locker of the parking lever device according to the embodiment of the present disclosure moves from the second stable position to the second temporary position.

As shown in FIGS. 4B, 7, and 8, when the locker 310 moves from the first temporary position "B" to the second stable position "C" of the lever track 210, the lever 200 and the handle 300 rotate together with each other. The locker 310 is guided by the outer wall, the third stopper 215, and the inner wall 217 of the lever track 210 and moves within the lever track 210. Here, as shown in FIG. 11A, the movement direction "d2" of the locker 310 within the lever track 210 is different from the direction in which the force is applied to the locker 310 by the user's operation of the handle 300 or the direction "d1" in which the force is applied to the locker 310 by the load of the lever 200 and the handle 300. As a result, the locker 310 may not easily move along the lever track 210.

As shown in FIGS. 4B, 8, and 9, when the locker 310 moves from the second stable position "C" to the second temporary position "D" of the lever track 210, the lever 200 and the handle 300 rotate together with each other. The locker 310 is guided by the inner wall 218, the second stopper 214, and the outer wall of the lever track 210 and moves within the lever track 210. Here, the movement direction "d4" of the locker 310 within the lever track 210 is different from the direction "d3" in which the force is applied to the locker 310 by the user's operation of the handle 300. As a result, the locker 310 may not easily move along the lever track 210.

FIGS. 12A and 12B are enlarged views of a first base hinge recess and a lever hinge recess of the parking lever device to which a tilting structure has been applied in accordance with the embodiment of the present disclosure. FIG. 13A is a partial enlarged view of the locker and the lever track, which is for describing the operation when the locker of the parking lever device to which the tilting structure has been applied in accordance with the embodiment of the present disclosure moves from the first temporary position to the second stable position. FIG. 13B is a partial enlarged view of the locker and the lever track, which is for describing the operation when the locker of the parking lever device to which a tilting structure has been applied in accordance with the embodiment of the present disclosure moves from the second stable position to the second temporary position.

The lever 200 and the base 100 of the parking release device 10 according to the embodiment of the present disclosure may be coupled to each other to have the tilting structure. Specifically, as shown in FIGS. 2, 12A, and 12B, the base 100 may include a first base hinge recess 130 into which the first hinge pin 110 is inserted. The lever 200 may include a lever hinge recess 230 into which the first hinge pin 110 is inserted. The first hinge pin 110 shown in FIG. 2 is inserted into the first base hinge recess 130 and the lever hinge recess 230, so that the lever 200 may be rotatably coupled to the base 100. Here, the size of the lever hinge recess 230 may be different from the size of the first base hinge recess 130.

Hereinafter, the operation of the parking release device 10 will be described in a case where the size of the lever hinge recess 230 is larger than the size of the first base hinge recess 130.

When the user pulls and rotates the handle 300 of the parking release device 10 in the state shown in FIG. 6, the locker 310 is, as shown in FIG. 7, positioned at the first temporary position "B". Here, as shown in FIG. 12B, the lever 200 may be in a state where the lever 200 is tilted close to the handle 300 by the force by which the user pulls the handle 300.

In this state, when the user pushes and rotates the handle 300 or when the handle 300 is rotated downward by the load of the lever 200 and the handle 300, the locker 310 is, as shown in FIG. 8, positioned at the second stable position "C". Here, as shown in FIG. 12A, the lever 200 may be in a state where the lever 200 is tilted far from the handle 300 by the force by which the user pushes the handle 300 or by the load of the lever 200 and the handle 300. As such, when the lever 200 tilted in a direction close to the handle 300 enters the state where the lever 200 is tilted far from the handle 300, the lever 200 moves in the direction in which the force is applied by the user in order to rotate the handle 300 or in the load direction of the lever 200 and the handle 300. Therefore, as shown in FIG. 13A, the difference between the movement direction "d2" of the locker 310 within the lever track 210 and either the direction in which the force is applied by the user in order to rotate the handle 300 or the load direction "d1" of the lever 200 and the handle 300 is reduced. As a result, the locker 310 is able to move easily along the lever track 210 and to be naturally moved to the second stable position "C" by the load of the lever 200 and the handle 300 even if the user does not separately operate the handle 300. Accordingly, the handle 300 is able to maintain its stable state at the parking release position.

Then, when the user pulls again and rotates the handle 300, the locker 310 is, as shown in FIG. 9, positioned at the second temporary position "D". Here, as shown in FIG. 12B, the lever 200 may be in a state where the lever 200 is tilted close to the handle 300 by the force by which the user pulls the handle 300. As such, when the lever 200 tilted in a direction far from the handle 300 enters the state where the lever 200 is tilted close to the handle 300, the lever 200 moves in the direction in which the force is applied by the user in order to rotate the handle 300. Therefore, as shown in FIG. 13B, the difference between the movement direction "d4" of the locker 310 within the lever track 210 and the direction "d3" in which the force is applied by the user in order to rotate the handle 300 is reduced. As a result, the locker 310 is able to move easily along the lever track 210 and user's operation feeling of the handle 300 can be improved.

The case where the size of the lever hinge recess 230 is larger than the size of the first base hinge recess 130 has been described in the foregoing description. Moreover, through a case where the size of the first base hinge recess 130 is larger than the size of the lever hinge recess 230, it is possible to obtain the same effect as described above.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A parking release device comprising:
   a base which is mounted on a vehicle;
   a lever which is rotatably coupled to the base and has a lever track formed therein; and
   a handle which is rotatably coupled to the base and comprises a locker which is coupled to the lever track,
   wherein the lever track comprises a first stable position, a second stable position, a first path which connects the first stable position and the second stable position, and a second path which is different from the first path and connects the second stable position and the first stable position,
   and wherein, as the handle is pivoted by the release of the parking, the locker moves from the first stable position to the second stable position along the first path, and as the handle is pivoted by the performing of the parking, the locker moves from the second stable position to the first stable position along the second path.

2. The parking release device of claim 1, wherein the handle further comprises a cap which presses the locker in a direction in which the locker is inserted into the lever track.

3. The parking release device of claim 2,
wherein the lever track further comprises a first stopper and a second stopper,
wherein the first stopper prevents the locker from entering the second path from the first stable position,
wherein the second stopper prevents the locker from entering the first path from the second stable position.

4. The parking release device of claim 3,
wherein the lever track further comprises a first temporary position which is located on the first path and is located between the first stable position and the second stable position, a second temporary position which is located on the second path and is located between the second stable position and the first stable position, a third stopper, and a fourth stopper,
wherein the third stopper prevents the locker from moving toward the first stable position from the first temporary position,
and wherein the fourth stopper prevents the locker from moving toward the second stable position from the second temporary position.

5. The parking release device of claim 4, wherein, within the lever track, a height of the second stable position is less than a height of the first temporary position, a height of the second temporary position is less than the height of the second stable position, and a height of the first stable position is less than the height of the second temporary position.

6. The parking release device of claim 5, wherein an inclined surface is disposed on the first path between the first stable position and the first temporary position.

7. The parking release device of claim 4, wherein the heights of the first stable position, the first temporary position, the second stable position, and the second temporary position are the same as each other within the lever track.

8. The parking release device of claim 7, wherein an inclined surface is disposed on the first path between the first stable position and the first temporary position and between the first temporary position and the second stable position, and is disposed on the second path between the second stable position and the second temporary position and between the second temporary position and the first stable position.

9. The parking release device of claim 1, further comprising a first hinge pin, wherein the base comprises a first base hinge recess, wherein the lever comprises a lever hinge recess, and wherein the first hinge pin is inserted into the first base hinge recess and the lever hinge recess, so that the lever is rotatably coupled to the base.

10. The parking release device of claim 9, wherein a size of the first base hinge recess is different from a size of the lever hinge recess.

* * * * *